Patented Nov. 2, 1948

2,452,949

UNITED STATES PATENT OFFICE 2,452,949

SULFOLANYL SULFONES

Rupert C. Morris, Berkeley, and Edward C. Shokal, Oakland, Calif., assignors to Shell Development Company, San Francisco, Calif., a corporation of Delaware No Drawing. Application October 22, 1945, Serial No. 623,865

10 Claims. (Cl. 260—329)

This invention relates to a novel and particularly useful class of organic compounds having at least two sulfonyl radicals, one of which is a member of a cyclic sulfone group while the other is directly attached to a saturated carbon atom of said cyclic sulfone group and is also directly linked to a carbon atom of another radical. The invention is also concerned with an efficient and economical method for the production of the new sulfones.

The saturated cyclic sulfone radical of four saturated carbon atoms and a sulfur atom in a five-membered heterocyclic ring having two oxygen atoms attached to the sulfur atom, which is one characteristic of the novel compounds of the invention, has at various times in the past been referred to as the "thiolane-1,1-dioxide" radical, the "cyclotetramethylene sulfone" radical, the "dihydrobutadiene sulfone" radical, and the "sulfolanyl" radical. The latter expression, derived from the name "sulfolane" given the simplest compound of this type which has the structural formula

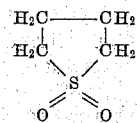

will be used herein as the most convenient and readily understandable term to generically define this arrangement of carbon atoms and a sulfonyl radical.

The compounds of the invention are further characterized by the fact that one of the saturated carbon atoms of the sulfolanyl radical is directly attached to a sulfone radical, that is, to sulfonyl radical (i. e. a

radical) which is also directly linked to a carbon atom, preferably, but not necessarily, a saturated carbon atom of a monovalent hydrocarbon radical, or substituted monovalent hydrocarbon radical. In other words, the new compounds essentially comprise a sulfolanyl radical having a hydrocarbon sulfonyl or a substituted hydrocarbon sulfonyl radical directly attached to at least one of the nuclear carbon atoms of the sulfolanyl radical. These compounds may be represented by the general structural formula

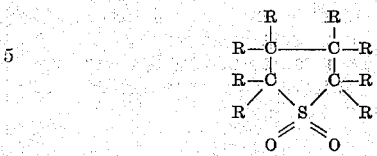

where at least one of the R radicals is a sulfone radical, i. e. a hydrocarbon sulfonyl or a substituted hydrocarbon sulfonyl radical, while the other R radicals attached to the nuclear carbon atoms are the same or different members of the group consisting of hydrogen and halogen atoms and hydroxy, amino, sulfonic and organic radicals, preferably hydrogen and hydrocarbon radicals such as alkyl, alkenyl, cycloalkyl, cycloalkenyl, aryl, aralkyl or alkaryl radicals.

Due to the unique structure, the sulfolanyl sulfones of the invention have properties which make them unexpectedly superior to the sulfones of different structure which have been previously produced or suggested. They are stable compounds, the lower members being soluble in water, alcohol and like polar solvents, the solubility decreasing with molecular weight so that those having hydrocarbon chains of ten or more carbon atoms are substantially insoluble in such solvents but are soluble in hydrocarbons. The compounds of the invention have in general a preferential solubility for aromatic and unsaturated aliphatic or cycloaliphatic hydrocarbons compared with the corresponding more saturated hydrocarbons which makes them highly useful in the separation of such compounds by extractive distillation or liquid-liquid solvent extraction methods.

The sulfolanyl sulfones miscible with natural or synthetic resins, plastics or rubbers are of exceptional value as plasticizers therefor, particularly in the preparation of clear, water-white products since the sulfolanyl sulfones of the invention are not subject to oxidation or discoloration, particularly yellowing, which are disadvantages associated with the use of unsaturated plasticizers. For example, the alkyl and naphthenyl sulfolanyl sulfones having five to eight carbon atoms in the alkyl or naphthenyl group are particularly desirable plasticizers for cellulose acetate and vinyl chloride polymers.

As pointed out in copending application, Serial No. 474,032, filed January 26, 1943, now Patent 2,393,925 of January 29, 1946 of which the present application is a continuation-in-part, the new sulfolanyl sulfones are remarkably effective insecticides, particularly against household pests such as flies. In this use they show an unexpected synergistic effect with other insecticides such as the ether thiocyanates and pyrethrum. In combination with these agents, the compounds of the invention produce a higher knock-down and kill according to modified Peet-Grady tests than is possible with either component alone in the same concentration. These properties of the novel sulfolanyl sulfones could not have been foreseen and they make these compounds especially advantageous in their many applications.

An especially preferred subgroup of the novel compounds are the unsubstituted sulfolanyl sulfones in which at least one hydrocarbon sulfonyl radical is directly attached to a nuclear carbon atom of a sulfolanyl radical, while the other free bonds of the nuclear carbon atoms of the sulfolanyl radical are directly attached to hydrogen atoms or monovalent hydrocarbon radicals. Compounds of this type in which a single hydrocarbon sulfonyl radical, preferably an alkane sulfonyl radical of not more than 20 carbon atoms, is attached to the heterocyclic ring are especially advantageous. A novel subgroup of compounds of this type are the alkyl-3-sulfolanyl sulfones of the structural formula

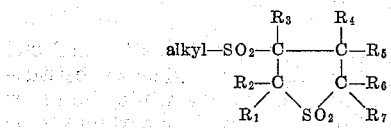

wherein the R's (regardless of subscripts) are members of the group consisting of the hydrogen atom and the aliphatic hydrocarbon radicals. For example, when alkyl represents an amyl radical and all the R's (regardless of subscripts) are each a hydrogen atom, the above formula represents amyl 3-sulfolanyl sulfone, while when alkyl is an amyl radical, $R_1$ is a methyl radical and $R_4$ an ethyl radical, the formula represents amyl 2-methyl-4-ethyl-3-sulfolanyl sulfone.

For certain purposes, compounds of the above formula in which $R_1$ or $R_4$ or $R_6$, preferably $R_4$, is a hydrocarbon sulfonyl radical, for example, dimethyl 3,4-sulfolanyl disulfone, 3-isopropyl 5-t-butyl 3,5-sulfolanyl disulfone, and the like, are especially advantageous.

A number of different methods are available for the production of new sulfolanyl sulfones of the invention. One which is of special advantage because of its efficiency and economy comprises oxidation of the corresponding sulfolanyl sulfides, which may be readily prepared by addition of mercaptans to sulfolenes. The sulfolenes are compounds having the same structure as the previously described sulfolanes except that two adjoining carbon atoms of the heterocyclic ring are linked by an olefinic double bond instead of a single bond. Mercaptans of all kinds add readily to the double bond of the sulfolenes and form sulfolanyl sulfides. The reaction, which is preferably carried out in the presence of a basic agent, is usually quite exothermic and it is generally advisable to control the conditions so that excessive temperature rises are avoided. While this may be achieved by cooling, it is preferred, in the interest of economy, to maintain the desired temperature by regulating the rate of addition of the reactants. For example, the sulfolene may be slowly added to the mercaptan, or vice versa, so as to keep the temperature within the preferred range of about 50° C. to 80° C. The mercaptan generally adds according to Markownikoff's rule but there is a tendency for the sulfide group to attach itself to the unsaturated carbon atom farthest removed from the sulfonyl radical. Thus, the same sulfide is formed by reacting tertiary butyl mercaptan with both 2-sulfolene and 3-sulfolene. Abnormal addition may be effected by carrying out the reaction in the presence of peroxides or other sources of free radicals, for example, lead tetraethyl, etc.

As oxidizing agents for the conversion of sulfolanyl sulfides to sulfolanyl sulfones, potassium permanganate, hydrogen peroxide, sodium perchlorite, nitric acid and the like may be used. With saturated sulfides it is usually advantageous to use a stoichiometric excess of such oxidizing agents as more complete reaction may thereby be achieved in a reasonable time and purification of the sulfolanyl sulfone obtained is simplified. Especially where highly purified products are not required, it may be preferable to use about the stoichiometric requirement, or substantially small amounts, of oxidizing agent. This is also true where the starting sulfolanyl sulfide contains unsaturated groups or substituents susceptible to oxidation which it is desired to preserve unchanged in the final sulfolanyl sulfone. In other cases the oxidation of such groups or substituents may not be undesirable and under such circumstances their conversion may be carried out simultaneously with the oxidation of the sulfide sulfur atom or atoms by using an appropriately larger amount of oxidizing agent. The oxidation may be carried out in the presence of an aqueous or other suitable solvent for the sulfolanyl sulfide being treated and/or the oxidizing agent it being generally advantageous to add the oxidizing agent to the sulfolanyl sulfide rather than vice versa in order to reduce the possibility of excessive oxidation leading to undesirable side reactions, and to facilitate control of the temperature which should preferably be kept below about 150° C. Oxidation with air or oxygen in the presence of suitable catalysts may also be used.

The process may be carried out with pure or substantially pure individual sulfolanyl sulfides or with mixtures thereof. Particularly suitable sources of such mixtures are the sulfides formed by reacting one or more sulfolenes with the mixtures of mercaptans which are recovered in the refining of cracked gasoline or other petroleum products, or the mixtures of secondary mercaptans formed by adding hydrogen sulfide to cracked paraffin wax or fractions thereof. Another advantageous source of mixed sulfides which are useful starting materials for the compounds of the invention is the reaction of sulfolenes with mercaptans formed by reaction of hydrogen sulfide with olefin polymers such, for example, as propylene or butylene polymers or copolymers. The sulfolanyl sulfides oxidized according to the invention need not be in a pure form but may be mixed with byproducts of the method of their formation, diluents or other compounds which do not interfere with the desired reaction.

An alternative method of producing the sulfolanyl sulfones, when the corresponding sulfolanyl sulfides are not readily available economically, comprises reacting suitable halosulfolanes, preferably chloro, bromo or iodosulfones with alkyl, aryl, alkaryl, aralkyl, or cycloaliphatic sulfinic acid salts. The reaction goes according to the following equation for the production of ethyl 3-sulfolanyl sulfone from 3-iodosulfolane and the potassium salt of ethyl sulfinic acid:

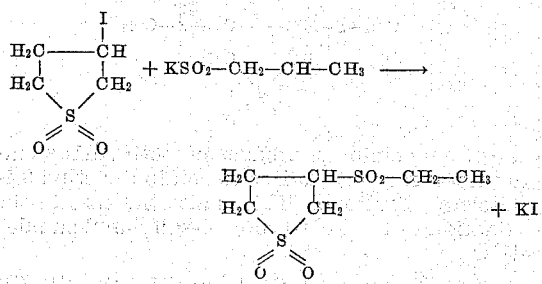

Boiling equal molecular amounts of the reactants in the presence of an aqueous or alcoholic medium at atmospheric pressure for about 20 minutes to an hour is usually an advantageous method of producing the new compounds of the invention according to this method. Chlorides react more slowly than the iodides but are generally much cheaper to prepare. By this method, for example, isopropyl 2-sulfolanyl sulfone is obtained from 2-iodosulfolane and sodium 2-propanesulfinate, and isoamyl 3,4-dimethyl-2-sulfolanyl sulfone is obtained from 2-chloro-3,4-dimethylsulfolane and potassium 3-methyl-1-butanesulfinate. 4-chloro-3-sulfolanol and 2,4-dimethyl-3,4-dichlorosulfolane are also suitable starting materials for the production of sulfolanyl sulfones according to this method. The method is of special advantage for the production of sulfolanyl sulfones having polymerizable groups in the molecule since the reaction can be successfully carried out in the presence of polymerization inhibitors such as hydroquinone, p-t-butyl catechol, etc. and the desired monomeric unsaturated sulfolanyl sulfones recovered. For instance, allyl 2-iodo-4-sulfolanyl carbonate may be converted to the corresponding methyl sulfone by reaction in the foregoing manner with the potassium salt of methanesulfinic acid and the obtained methyl(allyl-4-carbonate)-2-sulfolanyl sulfone polymerized to a hard, clear resin by warming with benzoyl peroxide.

Salts of sulfolanyl sulfinic acids, such as the potassium salt of 3-sulfolansulfinic acid, may be reacted in the same way with halides such as the butyl and cyclohexyl iodides or allyl iodide, etc., to produce the sulfolanyl sulfones of the invention. These sulfinic acids are new compounds which are the invention of the present inventors, which may be obtained, for example, by oxidation of the corresponding dry sodium mercaptides in the air at moderately elevated temperatures. Thus, 3-sulfolanyl thiol produced by reacting 3-sulfolene with hydrogen sulfide may be converted to the sodium mercaptide, oxidized to 3-sulfolanesulfinic acid which may be neutralized with potassium hydroxide, and the product reacted with allyl iodide to produce allyl 3-sulfolanyl sulfone.

Another method of producing the new sulfolanyl sulfones is by oxidation of the corresponding alkyl sulfolanyl sulfoxides and alkyl sulfolanyl sulfobromides, although as a general rule these methods are less preferred than those which have already been described. Combinations of such methods may be of advantage, particularly where products having more than one hydrocarbon sulfonyl group attached to a nuclear carbon atom or carbon atoms of the sulfolanyl radical are desired. For instance, ethyl isobutyl 3,3-sulfolanyl disulfone

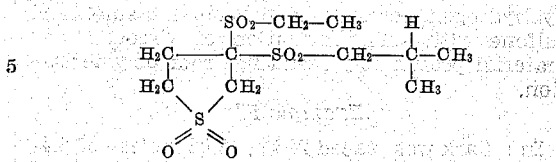

may be produced by reacting isobutyl 3-iodo-3-sulfolanyl sulfide with the potassium salt of isobutanesulfinic acid and then oxidizing the resulting ethyl(3-isobutyl-sulfide)-3-sulfolanyl sulfone. The reverse order of reaction may also be used in cases such as this.

The following examples serve to illustrate some of the suitable methods for producing the new compounds of the invention.

*Example I*

To a mixture of 839 grams of 94.3% mixed amyl mercaptans (boiling point, 113° C.–116.4° C.), equal to 7.59 moles, and 10 grams of sodium hydroxide was added 708 grams (6.0 moles) of 3-sulfolene. The reaction was rather slow at room temperature; however, on warming to 45° C., an exothermic reaction took place and the kettle temperature rapidly rose to 96° C. At the end of two hours at 50° C.–65° C. a titration indicated that the experiment was 95.8% complete. At the end of 6 hours the reaction mixture was washed a number of times with alkali and distilled. The product had a light yellow color and a strong odor of organic sulfide.

After a number of attempts it was found that this objectionable odor could be removed by treating the product with copper dust and Filter-Cel (manufactured by Filtrol Corporation, Los Angeles). The treatment was easily carried out by refluxing for an hour in an alcohol solution or by heating on the steam bath. The resulting product had a mild, not unpleasant odor. A yield of 92.2% of thioether was obtained, based on the 3-sulfolene used. This amyl 3-sulfolanyl sulfide is oxidized at room temperature with a stoichiometric excess of potassium permanganate to amyl 3-sulfolanyl sulfone. An 86.6 weight per cent yield is obtained of a solid product which on crystallization from alcohol melts at 102° C. Analysis of the product, which is substantially insoluble in petroleum ether and easily soluble in benzene, showed 25.2% sulfur compared with the calculated value of 25.19%.

*Example II*

Tertiary butyl mercaptan was slowly added to a rapidly stirred mixture of 2-sulfolene and sodium hydroxide. There was a rapid rise in temperature and at the end of approximately two hours the reaction was substantially complete. The resulting tertiary butyl 3-sulfolanyl sulfide (M. P. 72.3–72.8) is oxidized with an excess of potassium permanganate under the conditions of Example I and an excellent yield of t-butyl 3-sulfolanyl sulfone is obtained. On evaporation of an alcohol solution, this sulfone crystallizes as a white solid.

Using 3-sulfolene instead of 2-sulfolene as the starting material, the same product is obtained.

*Example III*

A quantity of methallyl mercaptan was reacted with 3-sulfolene by the same method as was used in the preceding examples. A very vigorous exothermic reaction took place, causing the loss of a part of the reaction mixture.

The recovered product, which distilled at 168° C.–180° C. under 2.5 mm. of mercury, is oxidized by hydrogen peroxide to methallyl 3-sulfolanyl sulfone with some formation of viscous tarry material presumably resulting from polymerization.

*Example IV*

In a flask was placed 296 g. (2.02 moles) of 2,4-dimethyl-3-sulfolene and 13 g. (0.20 mole) of 85% potassium hydroxide. With stirring was added 717 g. (6.89 moles) of amyl mercaptans. After standing at 60° C. for 143 hours the reaction mixture was washed with dilute sodium hydroxide and distilled. There was obtained 63 g. of product boiling at 154°–159° at 2 mm. and 345° C.–352° C. under atmospheric pressure. On oxidation of the mixed amyl 2,4-dimethyl-3-sulfolanyl sulfide with aqueous hydrogen peroxide solution of 30% concentration, the corresponding amyl 2,4-dimethyl-3-sulfolanyl sulfones are obtained in a good yield. The product purified by crystallization is a white solid substantially insoluble in aliphatic hydrocarbons.

*Example V*

A mixture of 0.394 mole of 2-methyl-3-sulfolene, 5.46 moles of amyl mercaptan and 2.5 g. of potassium hydroxide was heated at 60° C. for 48 hours to obtain amyl 2-methyl-3-sulfolanyl sulfide boiling at 157.8° C.–158.4° C. at less than 1 mm. Oxidation of this sulfide under the conditions used in Example I gives a substantial yield of amyl 2-methyl-3-sulfolanyl sulfone, a white solid soluble in ethyl alcohol.

*Example VI*

Phenyl mercaptan is reacted with 3-sulfolene in the presence of sodium hydroxide to produce phenyl 3-sulfolanyl sulfide. When this sulfide is oxidized with hydrogen peroxide a good yield of phenyl 3-sulfolanyl sulfone is obtained.

In the same way the addition products of 3-sulfolene with p-chlorophenyl mercaptan and beta-naphthiol give, on oxidation with hydrogen peroxide, p-chlorophenyl 3-sulfolanyl sulfone and beta-naphthyl 3-sulfolanyl sulfone, respectively.

By following the procedure described in the foregoing example, neopentyl 3-chloro-4-sulfolanyl sulfone may be produced from neopentyl 3-chloro-4-sulfolanyl sulfide; octyl 3-sulfolanyl sulfone may be produced from octyl 3-sulfolanyl sulfide; cetyl 3-hydroxyl-4-sulfolanyl sulfone from cetyl 3-hydroxy-4-sulfolanyl sulfide; 3,3,5-trimethylcyclohexyl 2 - methyl-5-sulfolanyl sulfone may be obtained from 3,3,5-trimethylcyclohexyl 2-methyl-5-sulfolanyl sulfide; benzyl 3-sulfolanyl sulfone from benzyl 3-sulfolanyl sulfide; tetrahydrofurfuryl 3,4-dichloromethyl-2-sulfolanyl sulfone from tetrahydrofurfuryl 3,4-dichloromethyl-2-sulfolanyl sulfide; phenyl 3-nitro-4-sulfolanyl sulfone from phenyl 3-nitro-4-sulfolanyl sulfide; 2-chloroallyl 3-sulfolanyl sulfone from 2-chloroallyl 3-sulfolanyl sulfide; and 3-sulfolanyl carboxymethyl sulfone may be produced from 3-sulfolanylthioacetic acid. When using starting sulfolanyl sulfides having two sulfide radicals attached to nuclear carbon atoms of the sulfolanyl radical as in dimethyl 3,4-sulfolenyl disulfides

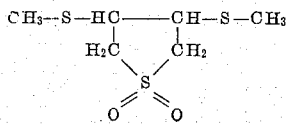

and the like, the oxidation may be controlled by using reduced amounts of oxidizing agent so as to produce a sulfide substituted monosulfone, 3-thiomethoxy-4-sulfolanyl methyl sulfone:

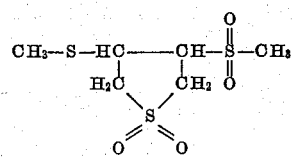

as the predominant product or both sulfide sulfur atoms may be oxidized to obtain dimethyl 3,4-sulfolenyl disulfone. This is also the case in the oxidation of bis-3-(n-propyl 4-sulfolanyl sulfide) ether

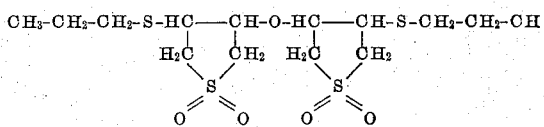

which yields the corresponding mono- and disulfones or mixtures thereof, depending upon the concentration of oxidizing agent maintained in the reaction mixture and the total amount of such agent used.

*Example VII*

Equal molecular amounts of 3-iodosulfolane and the potassium salt of 3-methylbutanesulfinic acid are reacted in water made slightly alkaline with potassium hydroxide for an hour at about 80° C. The resulting amyl-sulfolanyl sulfone is separated from the potassium iodide solution formed in the reaction and is purified by recrystallization from alcohol and is obtained as a white product melting at about 102° C.

By the method of Example VII stearyl 3-sulfolanyl sulfone may be produced by using stearyl and 3-sulfolanesulfinic acid potassium salt, and vinyl 3-sulfolanyl sulfone may be obtained by using vinyl iodide in place of the stearyl iodide, and preferably carrying out the reaction in the presence of sufficient of a polymerization inhibitor such as hydroquinone, p-t-butyl-catechol, etc. to prevent substantial losses through polymerization. In the same way, using a polymerization inhibitor 3-allyl-4-iodosulfolane is reacted with ethanesulfinic acid potassium salt to obtain ethyl 3-allyl-4-sulfolanyl sulfone and propargyl iodide is reacted with the potassium salt of 3-amino-4-sulfolanesulfinic acid.

The sulfolanyl sulfones of the invention produced in the foregoing or other suitable ways may be further reacted to produce other derivatives having valuable properties. Thus, those having hydroxyl or carboxylic acid groups in the molecule may be esterified, for example as described and claimed in copending application, Serial No. 495,376, filed July 19, 1943, or those containing a hydroxy group may be converted to ethers by the process of copending application, Serial No. 446,130, filed June 6, 1942, now Patent 2,419,082 of April 15, 1947. The new products may be halogenated and/or alkylated. They can also be used as intermediates in the production of other types of compounds. It will thus be seen that the invention offers many advantages and provides for the production of a wide variety of novel sulfolanyl sulfones which have many practical industrial applications. The new compounds are particularly useful in the natural and synthetic resin and lacquer industries; they are useful ingredients of insecticidal, parasiticidal and fungicidal compositions. When sulfonated, they may serve as wetting and emulsifying agents or the like. It will therefore be seen that the invention is capable of many variations and is not restricted to the compounds and methods described by way of illustration nor by any theory suggested in explanation of the improved results which are achieved.

We claim as our invention:

1. Amyl 3-sulfolanyl sulfone of the structural formula $$\begin{array}{c} C_5H_{11}-SO_2-CH_2-CH_2 \\ \phantom{C_5H_{11}-SO_2-}CH_2\phantom{XX}CH_2 \\ \phantom{C_5H_{11}-SO_2-XXX}S \\ \phantom{C_5H_{11}-SO_2-XX}O^{\nearrow}\phantom{X}^{\nwarrow}O \end{array}$$

2. An aryl 3-sulfolanyl sulfone of the structural formula $$\begin{array}{c} R-SO_2-CH_2-CH_2 \\ CH_2\phantom{XX}CH_2 \\ S \\ O^{\nearrow}\phantom{X}^{\nwarrow}O \end{array}$$

where R is an aryl hydrocarbon radical.

3. An alkyl 3-sulfolanyl sulfone of the structural formula $$\begin{array}{c} R-SO_2-CH_2-CH_2 \\ CH_2\phantom{XX}CH_2 \\ S \\ O^{\nearrow}\phantom{X}^{\nwarrow}O \end{array}$$

where R is an alkyl radical of not more than 20 carbon atoms.

4. A 3-sulfolanyl sulfone wherein the 3-sulfonyl radical is directly attached to a saturated carbon atom of a monovalent aliphatic hydrocarbon radical and thus having the structural formula $$\begin{array}{c} R-SO_2-CH_2-CH_2 \\ CH_2\phantom{XX}CH_2 \\ S \\ O^{\nearrow}\phantom{X}^{\nwarrow}O \end{array}$$

where R is a monovalent aliphatic hydrocarbon radical which is directly attached to the 3-sulfonyl radical by a saturated carbon atom.

5. A sulfolanyl sulfone having directly attached to a nuclear carbon atom of the solfolanyl radical, a single sulfonyl radical to which a monovalent aliphatic hydrocarbon radical of not more than 20 carbon atoms is also directly attached and having the structural formula $$\begin{array}{c} R\phantom{XXX}R \\ R-C\phantom{XX}C-R \\ R-C\phantom{XX}C-R \\ R^{\swarrow}\phantom{X}S\phantom{X}^{\searrow}R \\ O^{\swarrow}\phantom{X}^{\searrow}O \end{array}$$

where one of the R's is a radical of the structure $$R_1-\overset{O}{\underset{O}{\overset{\|}{S}}}-$$

wherein $R_1$ is monovalent aliphatic hydrocarbon radical of not more than 20 carbon atoms and the remaining R's each represent a hydrogen atom.

6. A sulfolanyl sulfone having directly attached to a nuclear carbon atom of the sulfoanyl radical, a sulfonyl radical which is also directly linked to a carbon atom of an aromatic group and having the structural formula $$\begin{array}{c} R\phantom{XXX}R \\ R-C\phantom{XX}C-R \\ R-C\phantom{XX}C-R \\ R^{\swarrow}\phantom{X}S\phantom{X}^{\searrow}R \\ O^{\swarrow}\phantom{X}^{\searrow}O \end{array}$$

where one of the R's is a radical of the structure $$R_1-\overset{O}{\underset{O}{\overset{\|}{S}}}-$$

wherein $R_1$ is an aromatic hydrocarbon radical and the remaining R's each represent a hydrogen atom.

7. A 3-sulfolanyl sulfone having directly attached to a nuclear carbon atom of the sulfolanyl radical, a sulfonyl radical which is also directly attached to a hydrocarbon radical and having the structural formula $$\begin{array}{c} R-SO_2-CH_2-CH_2 \\ CH_2\phantom{XX}CH_2 \\ S \\ O^{\nearrow}\phantom{X}^{\nwarrow}O \end{array}$$

where R is a monovalent hydrocarbon radical of not more than 20 carbon atoms.

8. The process of producing a polysulfone whereby a sulfone sulfide compound of the structural formula $$\begin{array}{c} R\phantom{XXX}R \\ R-C\phantom{XX}C-R \\ R-C\phantom{XX}C-R \\ R^{\swarrow}\phantom{X}S\phantom{X}^{\searrow}R \\ O^{\swarrow}\phantom{X}^{\searrow}O \end{array}$$

wherein at least one of the R's is a radical of the structure $R_1-S-$, where $R_1$ is a monovalent hydrocarbon radical of not more than 20 carbon atoms, and wherein the remaining R's each represents a member of the group consisting of the hydrogen atom and the lower alkyl radicals, is treated with an oxidizing agent at a temperature between 40° C. and 150° C., said treatment converting each radical of the structure $R_1-S-$ to a radical of the structure $$R_1-\overset{O}{\underset{O}{\overset{\|}{S}}}-$$

9. The process of claim 8 wherein $R_1$ is an alkyl radical of not more than 20 carbon atoms and wherein the compound of structural formula $$\begin{array}{c} R\phantom{XXX}R \\ R-C\phantom{XX}C-R \\ R-C\phantom{XX}C-R \\ R^{\swarrow}\phantom{X}S\phantom{X}^{\searrow}R \\ O^{\swarrow}\phantom{X}^{\searrow}O \end{array}$$

is treated with a stoichiometrical excess of potassium permanganate at a temperature between 50° C. and 100° C. for from 20 to 120 minutes.

10. A polysulfone of the structural formula $$\begin{array}{c} R\phantom{XXX}R \\ R-C\phantom{XX}C-R \\ R-C\phantom{XX}C-R \\ R^{\swarrow}\phantom{X}S\phantom{X}^{\searrow}R \\ O^{\swarrow}\phantom{X}^{\searrow}O \end{array}$$

wherein at least one of the R's is a radical of the structure

in which $R_1$ is a monovalent hydrocarbon radical of not more than 20 carbon atoms, and wherein the remaining R's each represents a member of the group consisting of the hydrogen atom and the lower alkyl radicals.

RUPERT C. MORRIS.
EDWARD C. SHOKAL.

REFERENCES CITED

The following references are of record in the file of this patent:

UNITED STATES PATENTS

| Number | Name | Date |
|---|---|---|
| 2,291,798 | Delfs | Aug. 4, 1942 |

OTHER REFERENCES

Backer: Rec. Trav. Chim., 56, 181 (1937).